(12) United States Patent
Jia et al.

(10) Patent No.: US 11,650,350 B2
(45) Date of Patent: May 16, 2023

(54) EXPERIMENTAL APPARATUS AND EXPERIMENTAL METHOD FOR PHYSICAL MODELING OF TECTONIC GEOMORPHOLOGY

(71) Applicant: NANJING UNIVERSITY, Nanjing (CN)

(72) Inventors: Dong Jia, Nanjing (CN); Xiaojun Wu, Nanjing (CN); Shufeng Yang, Nanjing (CN); Hanlin Chen, Nanjing (CN); Yiquan Li, Nanjing (CN); Zhuxin Chen, Nanjing (CN); Hongwei Yin, Nanjing (CN); Guoai Xie, Nanjing (CN); Yinqi Li, Nanjing (CN); Jianying Yuan, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 264 days.

(21) Appl. No.: 17/201,000

(22) Filed: Mar. 15, 2021

(65) Prior Publication Data
US 2021/0199846 A1 Jul. 1, 2021

(51) Int. Cl.
*G01V 99/00* (2009.01)

(52) U.S. Cl.
CPC .................. *G01V 99/005* (2013.01)

(58) Field of Classification Search
CPC ........ G01V 99/005; G01N 33/24; G01N 3/12; G01N 3/165; G01N 2203/0037; G01N 2203/0048; G09B 25/06
See application file for complete search history.

(56) References Cited

U.S. PATENT DOCUMENTS 6,899,272 B2 * 5/2005 Krichever .......... G06K 7/10693
235/462.37

FOREIGN PATENT DOCUMENTS

| CN | 109192035 A | * | 1/2019 | ............. G09B 23/40 |
| CN | 109192052 A | * | 1/2019 | |
| CN | 109345936 A | * | 2/2019 | ............. G09B 23/40 |
| CN | 208999423 U | * | 6/2019 | ............. G01N 33/24 |

OTHER PUBLICATIONS

CN-109192035-A_Translated (Year: 2019).*
CN-109192052-A_Translated (Year: 2019).*
CN-109345936-A_Translated (Year: 2019).*
CN-208999423-U_Translated (Year: 2019).*

* cited by examiner

Primary Examiner — Natalie Huls
Assistant Examiner — Michael J Singletary
(74) Attorney, Agent, or Firm — CBM Patent Consulting, LLC

(57) ABSTRACT

An experimental apparatus comprises a centrifuge basket experiment module, a structural deformation device, an image reflector and a geomorphometer; the centrifuge basket experiment module is installed on a cantilever of a drum centrifuge in a hanging manner during an experiment; the structural deformation device is configured for extending and compressing experimental materials; a mirror panel of the image reflector reflects images inside an experiment box through a transparent window; the geomorphometer can simulate rainfall and recover wastewater, and the apparatus can also heat the experimental materials. An image acquisition device is installed on a bulkhead of the experiment module and the cantilever of the centrifuge to acquire top and side images of the experiment box.

8 Claims, 3 Drawing Sheets

EXPERIMENTAL APPARATUS AND EXPERIMENTAL METHOD FOR PHYSICAL MODELING OF TECTONIC GEOMORPHOLOGY

This application claims priority to Chinese Patent Application Ser. No. CN 202110076112.5 filed on 20 Jan. 2021.

TECHNICAL FIELD

The present invention relates to an experimental apparatus and experimental method, in particular to an experimental apparatus and experimental method for a physical modeling experiment of tectonic geomorphology.

BACKGROUND

Structural physical modeling is a method capable of modeling and studying large-scale geologic structural deformation under laboratory conditions, and have wide applicability. At present, numerical modeling is the main method to study the evolution of tectonic geomorphology. However, due to the limitation of numerical modeling, it is difficult to model geomorphic evolution under complex structural deformation such as extension, compression and strike-slip. Therefore, physical modeling experiments play an irreplaceable role in the evolution of tectonic geomorphology. In recent decades, scholars have made great progress in the research fields of lithospheric rift extension, mid-ocean ridge spreading mechanism, fold-and-thrust structure, strike-slip pull-apart structure, gypsum-salt and magma diapir structure through hypergravity structural physical modeling experiments using centrifuges.

Centrifuges generating the hypergravity environment can generally be divided into two types: large long-arm centrifuges and small drum centrifuges. At present, drum centrifuge experiment modules have small size and low load capacity, and the experiment boxes for structural physical modeling are not provided with power-driven equipment, so that the deformation rate cannot be accurately controlled and rainfall simulating experiments cannot be carried out; in addition, the maximum acceleration of rotating arm geotechnical centrifuges is less than 600 g, power-driven devices in experiment modules can only be accurately controlled below 200 g, and there is no relevant experiment module without research on tectonic geomorphology. Therefore, existing drum centrifuges and long-arm centrifuges cannot meet the needs of physical modeling of tectonic geomorphology.

The applicant has been devoted to the study of physical modeling experiments of tectonic geomorphology. A patent with application number CN201811323854.8 of the applicant discloses an experimental apparatus for modeling structural deformation such as compression, extension and strike-slip in a normal gravity environment and realizing synchronous modeling of a geomorphic evolution process. The experimental apparatus is provided with a fine rainfall simulator. However, the experimental apparatus in the patent cannot satisfy modeling experiments in a hypergravity environment and has a single function. Therefore, an experimental apparatus with improved size of the experiment box and improved modeling functions is required for physical modeling of tectonic geomorphology in a hypergravity environment.

SUMMARY

Purpose of the present invention: the present invention aims to provide an experimental apparatus and an experimental method for physical modeling of tectonic geomorphology in a hypergravity environment for simulating rainfall and acquiring three-side images in real time.

Technical solution: an experimental apparatus for physical modeling of tectonic geomorphology, comprising a centrifuge basket experiment module, a structural deformation device, an image reflector and a geomorphometer; wherein the centrifuge basket experiment module is installed on a cantilever of a drum centrifuge in a hanging manner during an experiment; the structural deformation device comprises a lifting mechanism and a translation mechanism for extending and compressing experimental materials; a mirror panel of the image reflector reflects images inside an experiment box through a transparent window; and the geomorphometer comprises a rainfall simulator for simulating rainfall for the experimental materials.

The centrifuge basket experiment module comprises basket side plates, a basket base plate and a basket bottom structural plate; line connecting mechanisms for power supply and liquid supply are installed on each of the basket side plates, and a basket hoisting mechanism for connecting the cantilever of the centrifuge is arranged on the upper part.

The lifting mechanism and the translation mechanism comprise a lifting device, a lifting slide rail and a lifting slider which are connected in a matching way, a triangular push plate, a translation slider and a translation slide rail which are connected in a matching way, and a hydraulic cylinder for providing power.

The geomorphometer further comprises a rainfall simulator support mechanism and a master geomorphological modeling device support; the rainfall simulator and a rainwater pipe are installed on the rainfall simulator support mechanism, and the rainfall simulator support mechanism is connected to the master geomorphological modeling device support.

The geomorphometer further comprises a drainage tank, a water storage tank and a recovery suction pipe for draining and collecting wastewater.

The experimental apparatus further comprises a heating plate for heating the experimental materials and a heat insulation plate for preventing heat dissipation, wherein the heating plate and the heat insulation plate are arranged at the bottom of the experimental materials.

An experiment module window is arranged on a side of the centrifuge basket experiment module, and a high-speed image acquisition device for acquiring side images of the experiment box is installed on the outer bulkhead of the centrifuge.

A real-time monitoring camera for acquiring top images of the experiment box and reflection images of the mirror panel is installed on the cantilever of the centrifuge.

An experimental method for physical modeling of tectonic geomorphology of the present invention comprises the following steps:

(a) arranging the experimental materials and mechanisms of the experimental apparatus;

(b) turning on the centrifuge to run to a specified acceleration, and supplying or draining liquid to or from the hydraulic cylinder to drive the lifting device and the translation device to move;

(c) turning on the rainfall simulator to simulate rainfall, and turning on the heating plate to heat the experimental materials;

(d) turning on the high-speed image acquisition device and the monitoring camera to acquire structural deformation images in real time; and (e) stopping the centrifuge, turning off relevant mechanisms, and taking out the experiment box.

Advantageous effects: compared with the prior art, the present invention has the following remarkable advantages: (1) the experimental apparatus is installed on the cantilever of the drum centrifuge, and the physical modeling experiment for an evolution process of tectonic geomorphology is accomplished in a 2500 g hypergravity environment; (2) a mirror reflection image device together with the image acquisition device can capture structural deformation images of the top and two sides of the experiment box in real time; (3) with the functions of power supply and liquid supply, rainfall simulating experiments can be carried out; and (4) the experiment module is featured by large size, high load capacity, simple structure and cost saving.

DETAILED DESCRIPTION

The technical solutions of the present invention will be further described with reference to the accompanying drawings.

Figure 1:
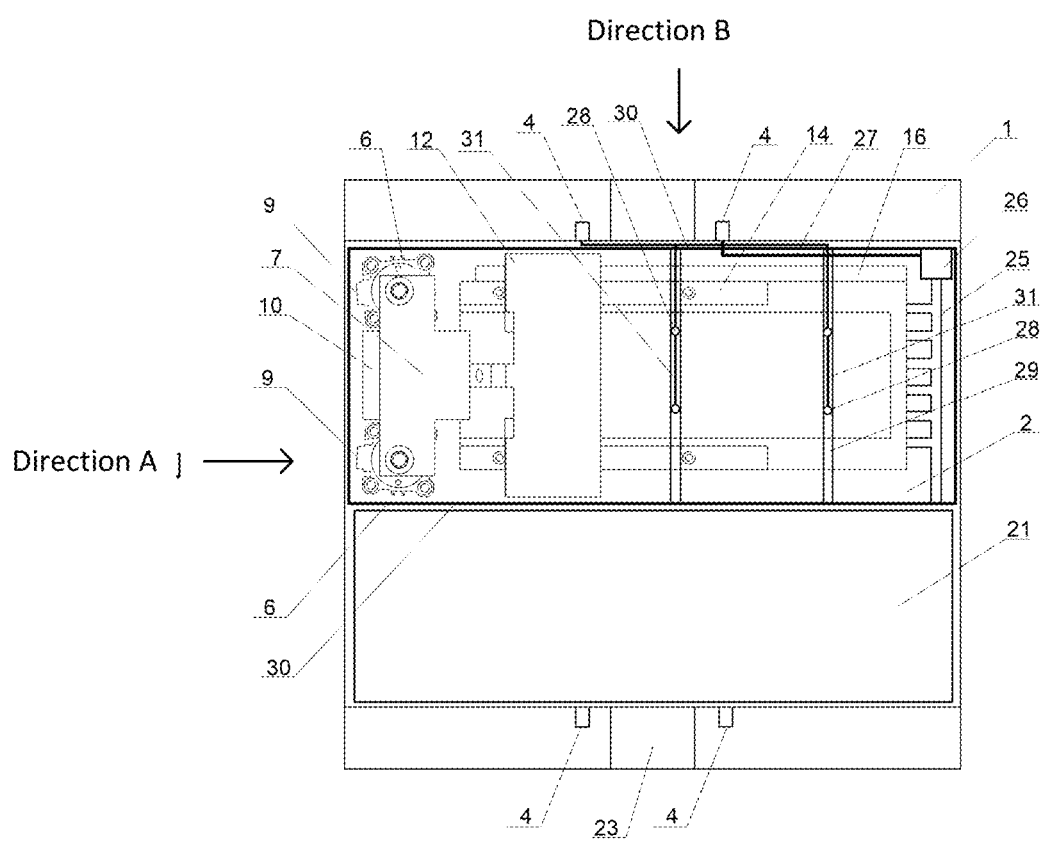
FIG. 1 is a top view of the experimental apparatus of the present invention.
Figure 2:
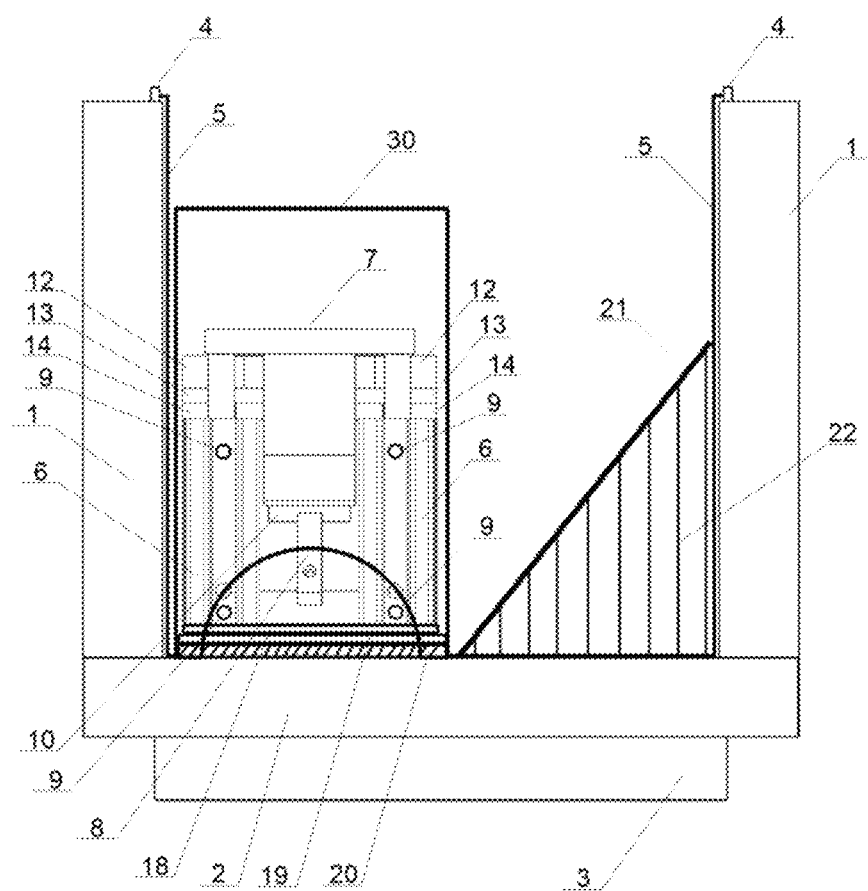
FIG. 2 is a side view of the experimental apparatus of the present invention in direction A.
Figure 3:
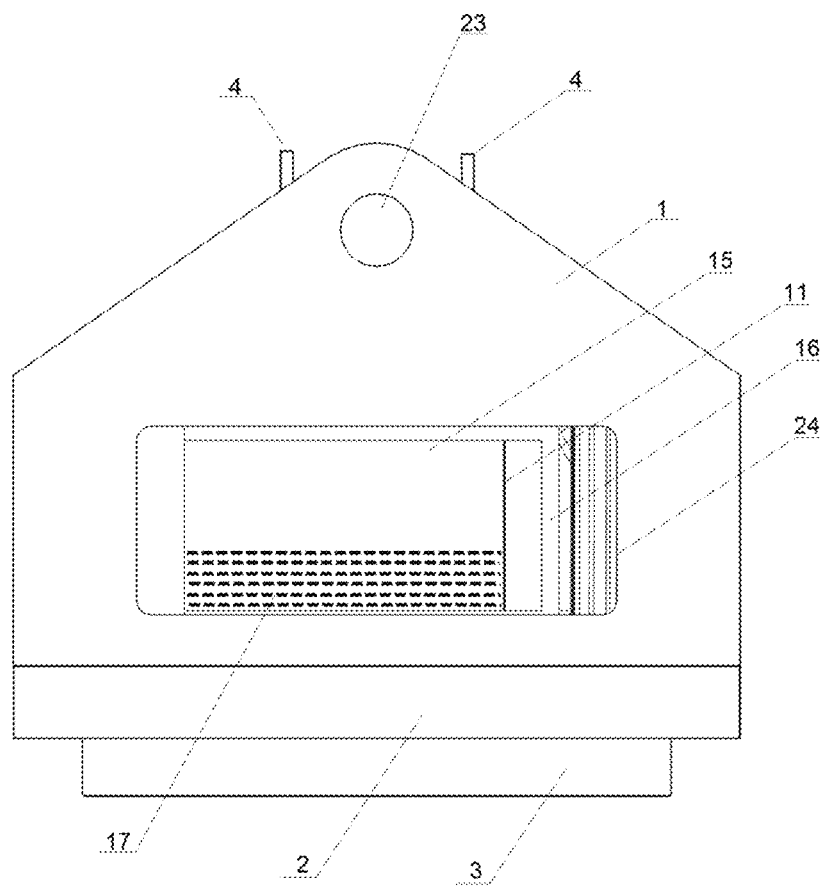
FIG. 3 is a side view of the experimental apparatus of the present invention in direction B.

As shown in FIGS. 1-3, the experimental apparatus of the present invention comprises a centrifuge basket experiment module, a structural deformation experimental device, an image reflector, a geomorphometer and experimental accessories, the structural deformation experimental device, the image reflector, the geomorphometer and the experimental accessories are installed in the centrifuge basket experiment module.

The centrifuge basket experiment module comprises two basket side plates 1, a basket base plate 2, a basket bottom structural plate 3 and an experiment module window 24, with dimensions larger than 400 mm×400 mm×300 mm; the upper part of the basket side plates 1 is provided with a basket hoisting mechanism 23 for connecting the cantilever of the centrifuge. Compared with a conventional turntable drum centrifuge, the experiment box of the experimental apparatus is installed on the cantilever of the centrifuge, so that the physical modeling experiment of tectonic geomorphology can be carried out in a 2500 g hypergravity environment. With a large size and high load capacity, the experiment box is featured by simple structure and cost saving compared with a long-arm centrifuge.

Two line connecting mechanisms 4 are installed on each of the two basket side plates 1 symmetrically along the basket hoisting mechanism 23, and the line connecting mechanisms 4 are hypergravity special pneumatic connecting mechanisms for supplying power and liquid to the experimental apparatus.

The structural deformation experimental device comprises an experiment box frame mechanism 16 and an experiment box base plate mechanism 18, wherein the experimental materials 17 are placed in the experiment box frame mechanism 16. The structural deformation experimental device further comprises a lifting mechanism and a translation mechanism, wherein the lifting mechanism comprises a lifting device 7, a lifting slide rail 8 and a lifting slider 10; the top of the lifting device 7 is connected with the lifting slider 10, a beam at the top of the triangular push plate is connected with the lifting slider 10, and the lifting slider 10 is matched with the lifting slide rail 8 to drive the triangular push plate to move vertically. The translation mechanism comprises a translation connecting plate 12, a translation slider 13 and a translation slide rail 14; the translation connecting plate 12 is connected with the lifting mechanism 7, the beam at the top of the triangular push plate 11 is connected with the translation slider 13, and the translation slider 13 is matched with the translation slide rail 14 to drive the triangular push plate 11 to move horizontally; the line connecting mechanisms 4 and a basket wiring groove structure 5 are connected with a hydraulic interface 9 on the hydraulic cylinder 6. The increase and decrease of liquid in the hydraulic cylinder 6 controls the raising and lowering of the lifting mechanism 7, and drives the triangular push plate 11 to extend and compress the experimental materials 17.

The image reflector comprises a mirror panel 21 and a mirror support mechanism 22, wherein the mirror panel 21 faces the transparent window 15 and reflects structural deformation images of the materials inside the experiment box.

The geomorphometer comprises a rainfall simulator 28, a rainfall simulator support mechanism 29, a master geomorphological modeling device support 30 and a rainwater pipe 31; wherein the rainfall simulator 28 is connected with the rainwater pipe 31, the rainwater pipe 31 is connected with pipelines on rotating arms of the centrifuge through the line connecting mechanisms 4 of the centrifuge basket experiment module, the rainfall simulator 28 and the rainwater pipe 31 are arranged on the rainfall simulator support mechanism 29, the rainfall simulator support mechanism 29 is connected with the master geomorphological modeling device support 30, and the rainwater pipe 31 simulates rainfall in the experiment box.

The geomorphometer further comprises a drainage tank 25, a water storage tank 26 and a recovery suction pipe 27, wherein the drainage tank 25 is configured for draining excess water from the experiment box into the water storage tank 26, and the recovery suction pipe 27 connected with the water storage tank 26 sucks the water out of the experiment module through the line connecting mechanisms 4 and sucks the water out of the centrifuge through the pipelines.

The experimental accessories comprise a heating plate 19 and a heat insulation plate 20; the heating plate 19 heats the experimental materials 17 at the bottom of the experiment box, and the temperature gradient changes from high to low in the vertical direction from the bottom to the surface of the experimental materials 17.

A high-speed image acquisition device is installed on the outer bulkhead of the centrifuge, facing the experiment module window 24, to acquire side images of structural deformation in real time; and the real-time monitoring camera in the middle of two rotating arms of the centrifuge acquires top images of structural deformation in real time, and acquires images on the opposite side of structural deformation mapped in the mirror panel 21.

EXPERIMENTAL METHOD (a) getting mechanisms of the experimental apparatus ready in a normal gravity environment, arranging the experimental materials 17, suspending the experimental apparatus to the cantilever of the centrifuge through the basket hoisting structure 23, connecting the line connecting mechanisms 4 with relevant lines on the cantilever of the centrifuge, including high voltage lines, low voltage lines and oil-water pipelines; and connecting to the hydraulic interface 9 and the heating plate 19 through the pipelines on the line connecting mechanisms 4 and the basket wiring groove structure 5;

(b) turning on the centrifuge to run to a specified acceleration value, and controlling the increase and decrease of liquid in the hydraulic cylinder 6 through liquid supply and drainage to drive the lifting device 7 and the triangular push plate 11 to move;

(c) simulating rainfall in the experiment box through the rainfall simulator 31 to form a unique tectonic geomorphology on the surface;

(d) turning on the heating plate 19 to heat the experimental materials at the bottom of the experiment box;

(e) turning on the high-speed image acquisition device and the monitoring camera to acquire structural deformation images in real time; and (f) stopping the centrifuge, taking out the experiment box, removing rainfall-related devices, and acquiring surface data of the deformed surface by using a 3D scanner and photographic device; or stopping the centrifuge to acquire surface data of the deformed surface in the experiment box at any time during the experiment.

What is claimed is:

1. An experimental apparatus for physical modeling of tectonic geomorphology, comprising a centrifuge basket experiment module, a structural deformation device, an image reflector and a geomorphometer; wherein the centrifuge basket experiment module is installed on a cantilever of a drum centrifuge in a hanging manner during an experiment; the structural deformation device comprises a lifting mechanism and a translation mechanism for extending and compressing experimental materials (17); a mirror panel (21) of the image reflector reflects images inside an experiment box through a transparent window (15); and the geomorphometer comprises a rainfall simulator (28) for simulating rainfall for the experimental materials;

wherein the centrifuge basket experiment module comprises basket side plates (1), a basket base plate (2) and a basket bottom structural plate (3); and line connecting mechanisms (4) for power supply and liquid supply are installed on each of the basket side plates (1).

2. The experimental apparatus for physical modeling of tectonic geomorphology according to claim 1, wherein the lifting mechanism and the translation mechanism comprise a lifting device (7), a lifting slider (10), a translation slider (13) and a triangular push plate (11), wherein the lifting slider (10) and the translation slider (13) are connected with the triangular push plate (11); and the lifting device (7) is hydraulically driven.

3. The experimental apparatus for physical modeling of tectonic geomorphology according to claim 1, wherein the geomorphometer further comprises a rainfall simulator support mechanism (29) and a geomorphological modeling device support (30); and a rainwater pipe (31) is arranged on the rainfall simulator support mechanism (29).

4. The experimental apparatus for physical modeling of tectonic geomorphology according to claim 1, wherein the geomorphometer further comprises a drainage tank (25), a water storage tank (26) and a recovery suction pipe (27) for draining and collecting wastewater.

5. The experimental apparatus for physical modeling of tectonic geomorphology according to claim 1, further comprising a heating plate (19) for heating the experimental materials (17) and a heat insulation plate (20) for preventing heat dissipation.

6. The experimental apparatus for physical modeling of tectonic geomorphology according to claim 1, wherein a high-speed image acquisition device for acquiring side images of the experiment box is installed on the outer bulkhead of the centrifuge.

7. The experimental apparatus for physical modeling of tectonic geomorphology according to claim 1, wherein a real-time monitoring camera for acquiring top and side images of the experiment box is installed on the cantilever of the centrifuge.

8. An experimental method using the experimental apparatus for physical modeling of tectonic geomorphology according to claim 1, comprising the following steps:

(a) arranging the experimental materials (17) and mechanisms of the experimental apparatus;

(b) turning on the centrifuge to run to a specified acceleration, and supplying or draining liquid to or from the hydraulic cylinder (6) to drive the lifting device and the translation device to move;

(c) turning on the rainfall simulator (31) to simulate rainfall, and turning on the heating plate (19) to heat the experimental materials;

(d) turning on the high-speed image acquisition device and the monitoring camera to acquire structural deformation images in real time; and (e) stopping the centrifuge, turning off relevant mechanisms, and taking out the experiment box.

* * * * *